United States Patent [19]

Schmoock

[11] 4,214,477
[45] * Jul. 29, 1980

[54] FLANGELESS ELECTROMAGNETIC FLOWMETER

[75] Inventor: Roy F. Schmoock, Yardley, Pa.

[73] Assignee: Fischer & Porter Co., Warminster, Pa.

[*] Notice: The portion of the term of this patent subsequent to Jul. 4, 1995, has been disclaimed.

[21] Appl. No.: 967,138

[22] Filed: Dec. 7, 1978

Related U.S. Application Data

[62] Division of Ser. No. 811,276, Jun. 29, 1977, Pat. No. 4,098,118.

[51] Int. Cl.² .................................... G01F 1/58
[52] U.S. Cl. .................................... 73/861.12
[58] Field of Search .................................... 73/194 EM

[56] References Cited

U.S. PATENT DOCUMENTS

| | | | |
|---|---|---|---|
| 3,490,282 | 1/1970 | Wada | 73/194 EM |
| 3,636,764 | 1/1972 | Funfstuck | 73/194 EM |
| 3,745,824 | 7/1973 | Mannherz et al. | 73/194 EM |
| 3,824,856 | 7/1974 | Yard | 73/194 EM |
| 3,981,190 | 9/1976 | Vidmantas | 73/194 EM |
| 4,065,965 | 1/1978 | Ackerman et al. | 73/194 EM |
| 4,098,118 | 7/1978 | Schmoock | 73/194 EM |

FOREIGN PATENT DOCUMENTS

| | | | |
|---|---|---|---|
| 2040682 | 2/1972 | Fed. Rep. of Germany | 73/194 EM |
| 1016923 | 1/1966 | United Kingdom | 73/194 EM |

*Primary Examiner*—Charles A. Ruehl
*Attorney, Agent, or Firm*—Michael Ebert

[57] ABSTRACT

A flangeless electromagnetic flowmeter insertable between upstream and downstream pipes which have the same internal diameter, the adjacent ends of said pipes having like flanges. The cylindrical body of the flowmeter is interposed between the flanged ends of the pipes, the body being provided with an annular pressure vessel formed of insulating material to define a central flow passage whose diameter matches the internal diameter of the pipe whereby the flowmeter functions to meter the flow rate of fluid passing through the pipes and the passage along a longitudinal axis extending therethrough. A pair of electromagnetic coils is embedded in the vessel at opposed positions with respect to the passage to establish a magnetic field therein whose lines of flux are substantially perpendicular to the longitudinal axis. Also embedded in the vessel is a pair of electrodes at opposed positions with respect to the passage, the electrodes lying along a transverse axis at right angles both to the lines of flux and the longitudinal axis. The flanged ends of the pipe are bridged by bolts to clamp the flowmeter body therebetween.

5 Claims, 18 Drawing Figures

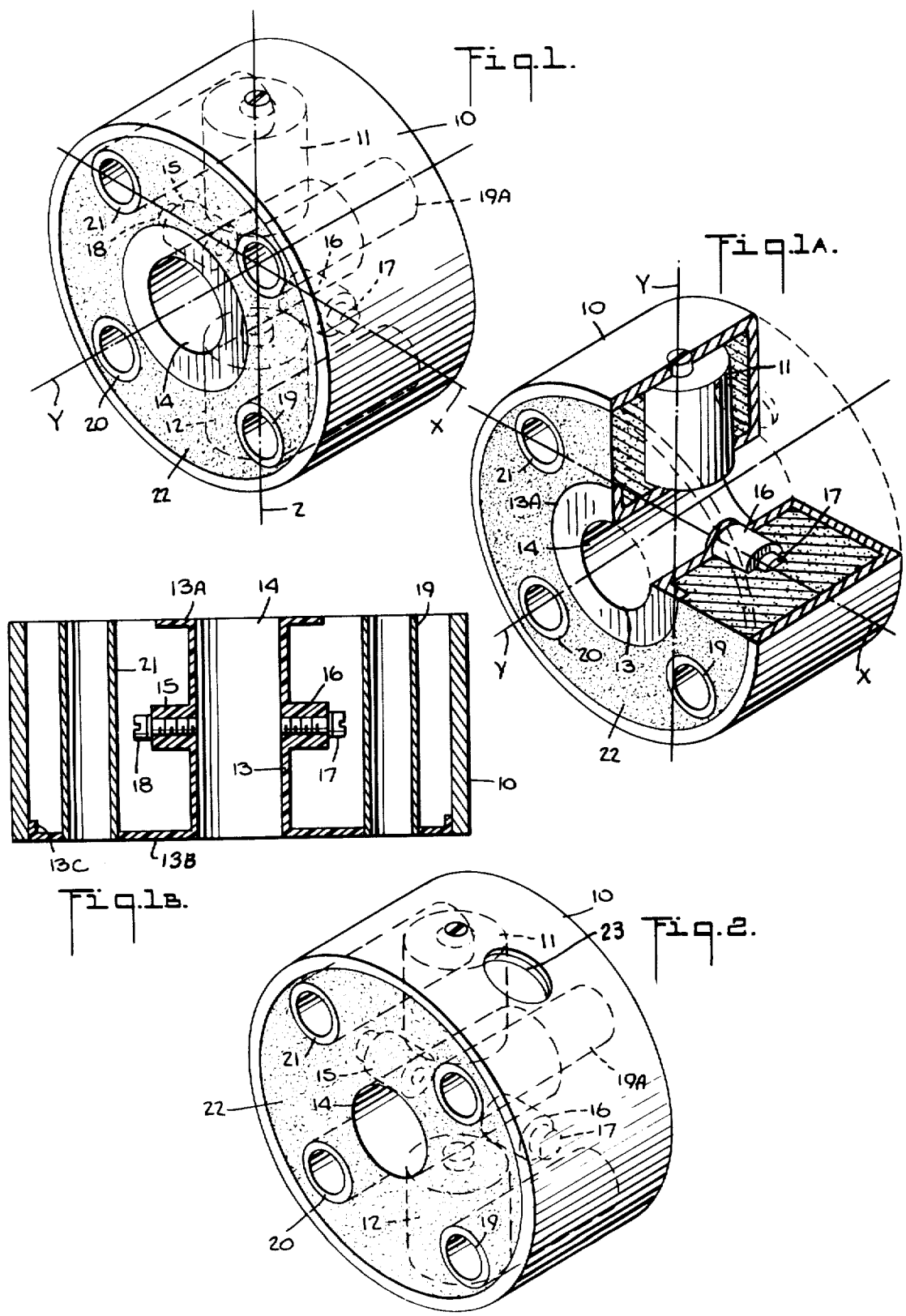

FLANGELESS ELECTROMAGNETIC FLOWMETER

RELATED APPLICATION

This application is a division of the copending application Ser. No. 811,276, filed June 29, 1977, which in turn is a division of an application that is now U.S. Pat. No. 4,098,118.

BACKGROUND OF INVENTION

This invention relates generally to electromagnetic flowmeters, and more particularly to a flangeless flowmeter whose components are integrated to form a highly compact, low-cost unit that may be readily installed in a flow line.

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul. The flowmeter can be used to meter liquids without regard to heterogenous consistency.

An added advantage of an obstructionless construction is that pressure losses are reduced to levels encountered in equivalent lengths of equal diameter pipeline, thereby reducing or conserving pressure source requirements in new or existing hydraulic lines as compared to other metering techniques.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

Typical of commercially-available electromagnetic flowmeters is that unit manufactured by Fischer & Porter Co. of Warminster, Pa., whose Model 10D1430 flowmeter is described in Instruction Bulletin 10D1430A-1-Revision 4. This meter consists of a carbon-steel pipe spool flanged at both ends and serving as a meter body. Saddle-shaped magnetic coils are fitted on opposite sides of the inner surface of the meter body, the magnetically-permeable pipe spool acting as a core or return path for the magnetic field generated by these coils.

The coils in this known form of meter are potted within an epoxy-based compound. An interior liner of neoprene or similar insulating material is inserted within the pipe and turned out against the faces of the mounting flanges. Disposed at diametrically-opposed positions within the central portion of the meter body are two cylindrical electrodes that are insulated from the pipe, the faces of the electrodes being flush with the inner surface of the pipe and coming in contact with the fluid to be metered. Connected to these electrodes and housed in a box external to the pipe are calibration components and a pre-amplifier.

In installing a standard magnetic flowmeter of the above-described type, the meter is interposed between the upstream and downstream pipes of a fluid line, each pipe having an end flange. The mounting flanges on the meter are bolted to the flanges of line pipes. It is, of course, essential that the circle of bolt holes on the mounting flanges of the meter match those on the pipe flanges.

In a magnetic flowmeter, the flow tube is subjected to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters of the above-described type which are made up of components that must be assembled are generally of substantial size and weight and quite expensive to manufacture.

SUMMARY OF THE INVENTION

In view of the foregoing, it is the primary object of this invention to provide a compact and readily installable electromagnetic flowmeter whose weight and dimensions are substantially smaller than existing types of meters.

Among the significant features of a magnetic flowmeter in accordance with this invention is that despite its reduced volume and weight, it is capable of withstanding high fluid pressures and operates efficiently and reliably to accurately measure flow rates.

Moreover, a flowmeter in accordance with the invention is much less costly to produce than existing types. Indeed, while known types of meters cost hundreds of dollars to produce, a flowmeter in accordance with the invention can be manufactured for under a hundred dollars at current labor and material costs, thereby making it possible to use these flowmeters in many industrial applications in which the installation of existing types is precluded because of their high cost.

More particularly, it is an object of this invention to provide a miniature magnetic flowmeter which includes a ferromagnetic ring serving as a mold within which is formed an annular pressure vessel of high strength insulating material that encapsulates the electromagnetic field coils and the electrodes of the unit, the pressure vessel having a central passage through which the fluid to be metered is conducted, whereby the molding ring functions not only as a magnetic return path for the coils but also as a structural reinforcement for the pressure vessel molded therein.

Briefly stated, these objects are attained in a flangeless meter interposable between the flanged ends of upstream and downstream line pipes for metering fluid passing through the line.

The meter is constituted by a ferromagnetic ring within which a pair of electromagnet coils is supported at opposed positions along a diametrical axis normal to the longitudinal axis of the ring, the longitudinal axis passing through the central flow passage of an annular pressure vessel which is formed of high strength insulating material and is molded within the ring to encapsulate the coils as well as a pair of electrodes disposed at diametrically-opposed positions with respect to the passage along a transverse axis at right angles to the coil axis to define a unitary structure.

The unit is compressible between the end flanges of the pipes by bringing bolts that pass through bore holes in the pressure vessel or lie outside of the ring to encage the unit.

OUTLINE OF THE DRAWINGS

For a better understanding of the invention as well as other objects and further features thereof, reference is made to the following detailed description to be read in conjunction with the accompanying drawings, wherein:

FIG. 1 is a perspective view of a first embodiment of an electromagnetic flowmeter of the ring type in accordance with the invention, the internal components being shown in dotted lines;

FIG. 1A is the same as FIG. 1, except that a sector of the structure is cut away to expose some of the internal components;

FIG. 1B illustrates, in section, the molding arrangement for fabricating the meter shown in FIG. 1;

FIG. 2 is a perspective view of a second embodiment of an electromagnetic flowmeter of the ring type in accordance with the invention, this structure differing from that in FIG. 1 only in that it lacks a central shell;

DESCRIPTION OF INVENTION

First Embodiment

Figure 3:
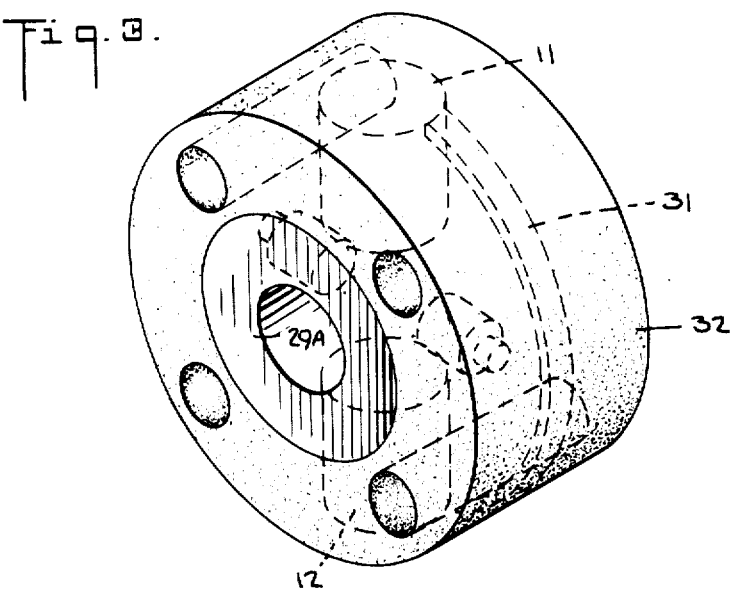
FIG. 3 is a perspective view of a third embodiment of an electromagnetic flowmeter in accordance with the invention, the meter being ringless.

Referring now to FIGS. 1, 1A and 1B, there is shown a preferred embodiment of a flowmeter in accordance with the invention which includes a cylindrical ferromagnetic ring 10, preferably machined of cold rolled steel. Mounted within ring 10 is a pair of electromagnet coils 11 and 12. These coils occupy opposed positions along a diametrical axis Z which is normal to the longitudinal axis Y of the ring.

Coils 11 and 12 are conventional solenoids with a ferromagnetic core that may also be of cold rolled steel, the cores being bolted or screwed to ring 10 whereby the ring serves to complete a magnetic path between the coils.

Concentrically disposed within ring 10 is a spool-shaped plastic shell 13 defining a central flow passage 14 extending along longitudinal axis Y. Shell 13 is provided with a front end flange 13A of small diameter whose face lies in the same plane as the front end of ring 10, and a rear end flange 13B whose diameter matches the internal diameter of the ring and whose face lies in the same plane as the rear end of the ring. Flange 13B, as best seen in FIG. 1B, is provided with a circular rim 13C which fits within the rear end of the ring to form therewith a molding cup which is open at the front end.

Shell 13 is provided, at a position midway between its flanges, with a pair of internally-threaded tubular sockets 15 and 16 which project laterally therefrom at diametrically-opposed positions with respect to central flow passage 14. Threadably received within sockets 15 and 16 are electrodes 17 and 18 whose faces are flush with the wall of passage 14 and therefore make direct contact with the fluid passing therethrough.

Mounted on rear flange 13B at equi-spaced positions along a circle concentric with the flange are four tubes, 19, 19A, 20 and 21 which serve to define a circle of mounting bores. The tubes are preferably of insulating Teflon (TFE).

The molding space between ring 10 and shell 13 is filled with a potting compound such as an epoxy resin of the reactive type forming a tight cross-linked polymer network characterized by toughness, good adhesiveness, corrosion and chemical resistance as well as good dielectric properties. This epoxy compound may be a thermosetting resin based on the reactivity of the epoxide group or from polyolefins oxidized with peracetic acid. The resultant body which adheres to ring 10 constitutes an annular pressure vessel 22 that encapsulates coils 11 and 12 and electrodes 17 and 18 to form an integrated, unitary flowmeter structure.

Shell 13 is preferably injection molded of KYNAR (polyvinylidene fluoride) which has high tensile and compressive strength, is thermally stable and resistant to acids, alkalies and halogens, thereby making it suitable for virtually all fluids, however, corrosive, in a very broad temperature range.

Thus to manufacture the unit, it is only necessary to bolt coils 11 and 12 to ring 10, to attach electrodes to shell 13, and to insert the shell in the ring, after which the potting compound is introduced to fill the spaces between the ring and shell and to define the annular pressure vessel 22. The leads (not shown) connected to the coils and to the electrodes are embedded in the pressure vessel and taken out through an opening 23 in the ring. In practice, to null out noise, each electrode may be provided with two leads going to a potentiometer, the output of the electrodes being taken from the sliders of the two potentiometers.

In operation, the high-strength pressure vessel 22 is subjected to the pressure of the fluid being metered, the fluid passing through passage 14 whose diameter matches the internal diameter of the downstream and upstream pipes between which the unit is interposed. The outer ring 10 not only serves as the magnetic return path for the electromagnets to produce an electromagnetic field whose lines of flux are parallel to axis Z and mutually perpendicular to axes X and Y, but it also acts to structurally reinforce the pressure vessel, so that the unit is capable of withstanding exceptionally high fluid pressures.

The nature of the unit is such that it lends itself to miniature flowmeter sizes in the range of from 0.1" to 2" as well as for 3" to 4" sizes. Tubes 19, 20 and 21 need not be a permanent part of the unit, and release agents may be provided therewith, making it possible to remove these tubes after the pressure vessel is molded, so that the mounting bores are then formed directly in the vessel.

Figure 9:
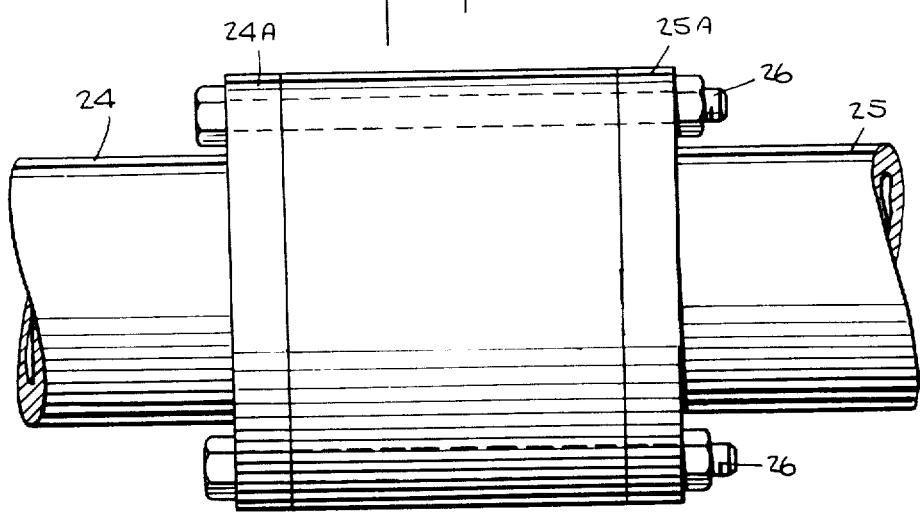
FIG. 9 illustrates how a meter in accordance with the invention having bore holes therein which register with the flange holes of the line pipes is compressively mounted in the fluid line.
Figure 10:
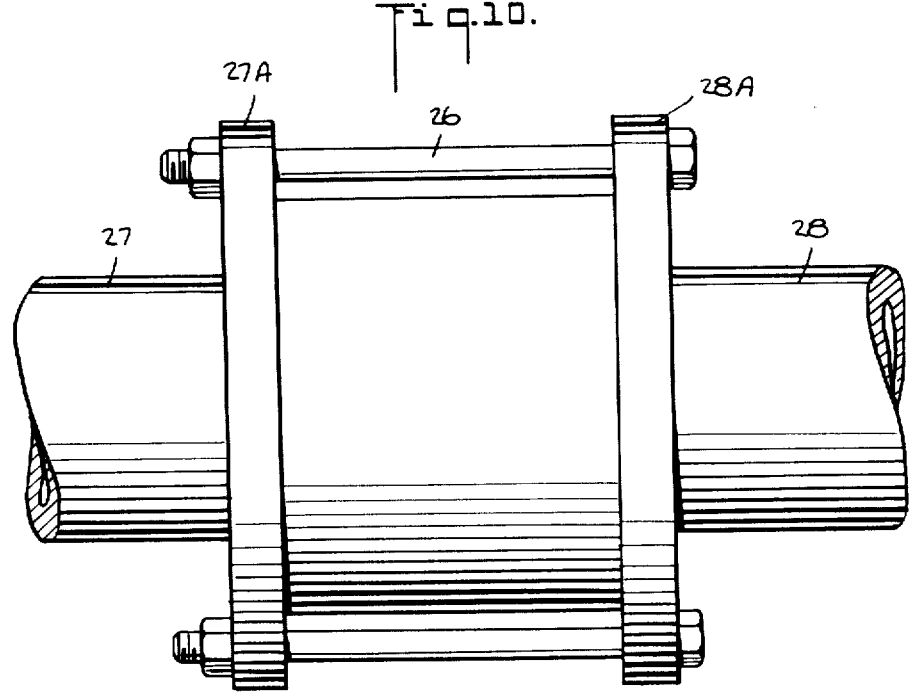
FIG. 10 illustrates how a meter in accordance with the invention whose bore holes do not register with the flange holes of the line pipes, is compressively mounted in the fluid line.

The manner in which the unit may be installed is shown in FIGS. 9 and 10. In FIG. 9, the upstream and downstream pipes 24 and 25 are provided with end flanges 24A and 25A, respectively, each having a circle of bolt holes which register with the bores in tubes 19, 20 and 21 of the unit. Bridging the flanges 24A and 25A are three bolts 26 which pass through tubes 19, 20 and 21 and serve to compress the flowmeter unit between the pipe flanges. In practice, gaskets may be placed at the ends of the units to insure an effective seal to prevent fluid leakage.

It is not essential, however, that the upstream and downstream pipes have flanges with bores which match those in the unit. Thus, as shown in FIG. 10, the upstream and downstream pipes 27 and 28 have flanges 27A and 28A whose bores are outside the circumference of ring 10. Bolts 26 in this instance act to encage the unit as well as to subject it to compression between the pipe flanges.

Second Embodiment

This embodiment, as shown in FIG. 2, is identical to that of FIG. 1, except that in place of a flanged plastic shell 13 which forms a permanent part of the unit, use is made of a removable core (not shown) which serves to define with ring 10 the mold for the potting compound that encapsulates coils 11 and 12 and electrodes 17 and 18 and defines the annular pressure vessel 22. But upon completion of the molding operation, the core is removed to form a flow passage 14 directly in the pressure vessel, not in the shell. This unit may be mounted in the same manner as the first unit.

Third Embodiment

Figure 3B:
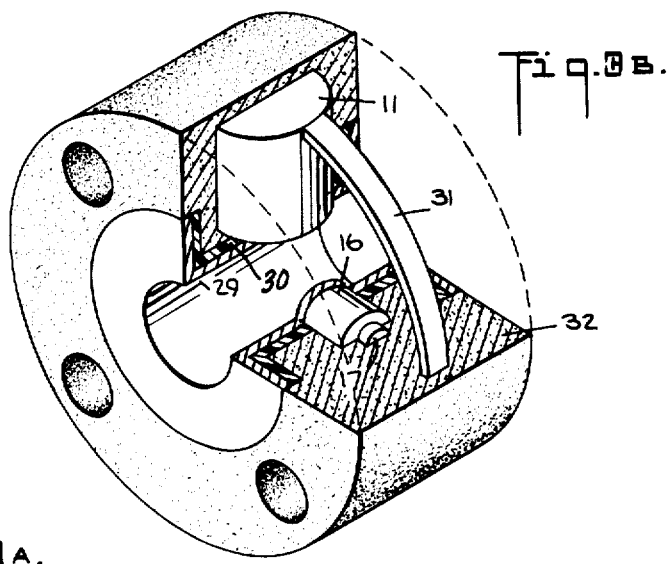
FIG. 3B illustrates in section the molding arrangement for fabricating the meter shown in FIG. 3.
Figure 3A:
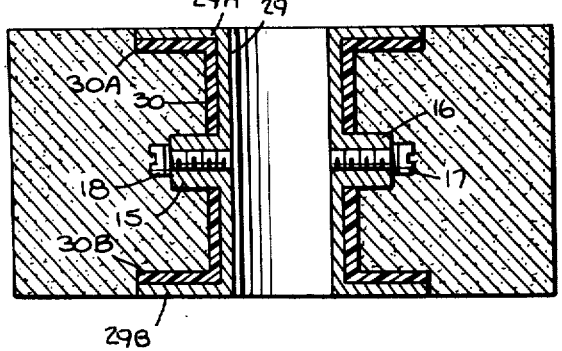
FIG. 3A is a view which is the same as FIG. 3, except that a sector is cut from the structure to expose some of the internal components.

In the embodiment illustrated in FIGS. 3, 3A and 3B, instead of an outer steel ring as in the first and second embodiments, plastic shell 29, which is similar to that of shell 13 in FIG. 1 and is injection molded of the same material (KYNAR), is surrounded and reinforced by a high-strength non-magnetic spool 30 such as non-magnetic steel, brass or plastic material whose front and rear flanges 30A and 30B conform to and back up the front and rear flanges 29A and 29B of the shell. Electrodes 17 and 18 are molded into the shell within sockets 15 and 16 which project through openings in the spool.

Since there is no ring, the magnetic return path in this instance is provided by ferromagnetic straps 31 which interconnect the cores of electromagnet coils 11 and 12.

Electrodes 17 and 18 and coils 11 and 12 are encapsulated in a molded pressure vessel 32 which is formed by a potting compound of the type previously described. However, in this instance, in lieu of a ferromagnetic ring which forms the mold in conjunction with the plastic shell and becomes a permanent structural component of the unit, use is made of a releasable molding ring of plastic or other suitable material. Then when the pressure vessel is completed and the ring is removed, the outer surface of the unit is that of the pressure vessel 32.

Fourth Embodiment

Flowmeters are known, such as those disclosed in U.S. Pat. No. 3,174,831 and in the copending application of Appel, Ser. No. 617,982, filed Sept. 29, 1975, now U.S. Pat. No. 3,999,443, in which a meter energized by an a-c field is provided with a pair of planar detection electrodes of large area and a driven shielding electrode of even larger area cooperating with each detector electrode.

For measuring dielectric fluids, the electrodes are covered by the dielectric lining of the flow tube and are thereby protected from the fluid. This lining, together with the dielectric of the fluid, constitutes the dielectric of a capacitor whose plates are formed by the planar measuring electrodes.

Figure 4:
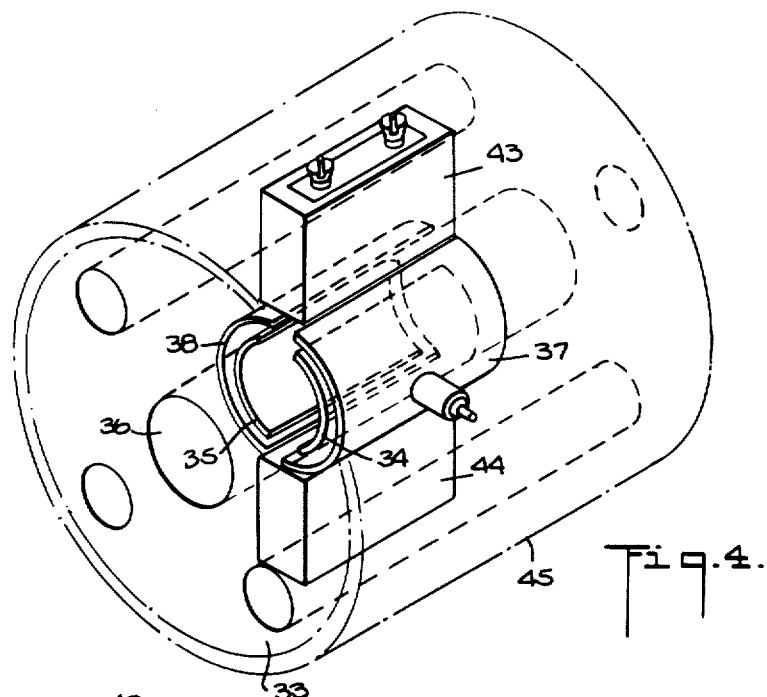
FIG. 4 illustrates, in perspective, a fourth embodiment of an electromagnetic flowmeter in accordance with the invention, the meter being of the driven-shield type.
Figure 4B:
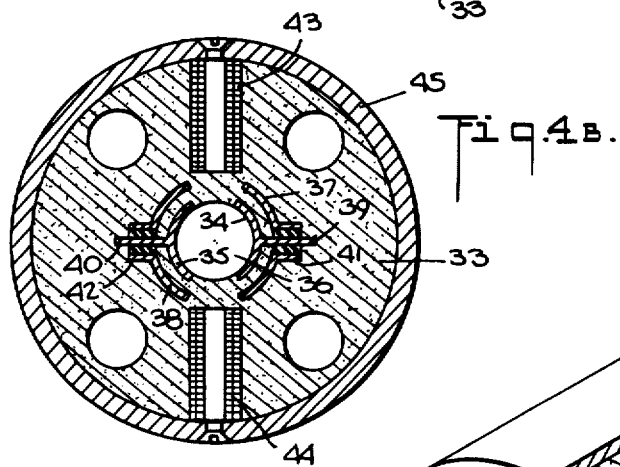
FIG. 4B is a transverse section taken through the meter shown in FIG. 4.
Figure 4A:
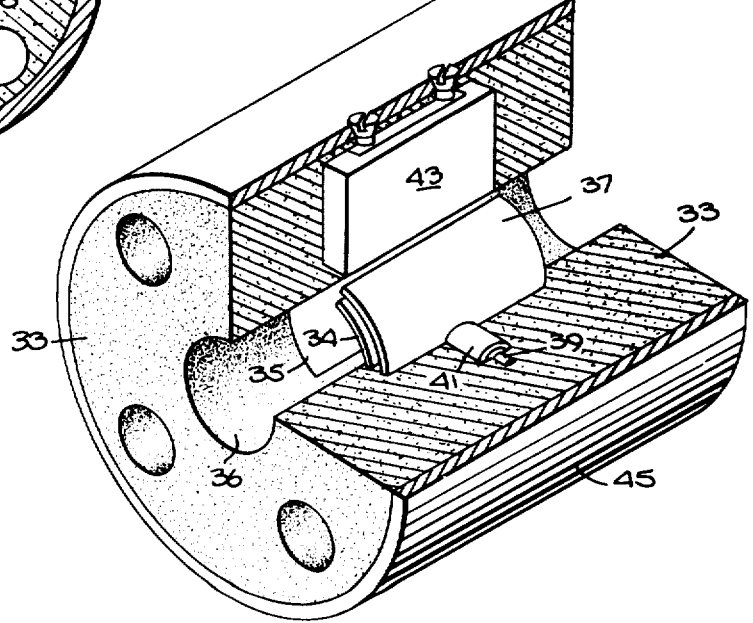
FIG. 4A is the same as FIG. 4, save that a sector of the cylinder has been cut away to expose some of the internal components.

In the embodiment illustrated in FIGS. 4, 4A and 4B, the molded annular pressure vessel 33 has embedded therein a pair of planar detector electrodes 34 and 35 which are curved to conform to the central passage 36 running through the pressure vessel. Also embedded in the potting compound behind the detector electrodes are a pair of shielding electrodes 37 and 38 which are larger in area than the detector electrodes but with a concentric curvature. Leads 39 and 40 for the detector electrodes are the inner conductors of coaxial lines whose outer conductors 41 and 42 are connected to the shielding electrodes.

Electromagnet coils 43 and 44 for this circuit have a rectangular cross-section with a rectangular core rather than the usual cylindrical solenoid form. The purpose of this rectangular structure is to establish an electromagnetic field whose lines of flux which intersect the longitudinal flow axis are operative within the wide region covered by the broad area of the electrodes. In this embodiment, detecting electrodes 34 and 35 are exposed to and in direct contact with the fluid passing through passage 36.

Coils 43 and 44 are bolted to a ferromagnetic outer ring 45 which serves both as the magnetic return path and as the reinforcement for pressure vessel 33. In this instance, it will be seen that four symmetrically-arranged bore holes 46, 47, 48 and 49 are provided to compressively mount the unit between the end flanges of the line pipes.

Fifth Embodiment

Figure 5:
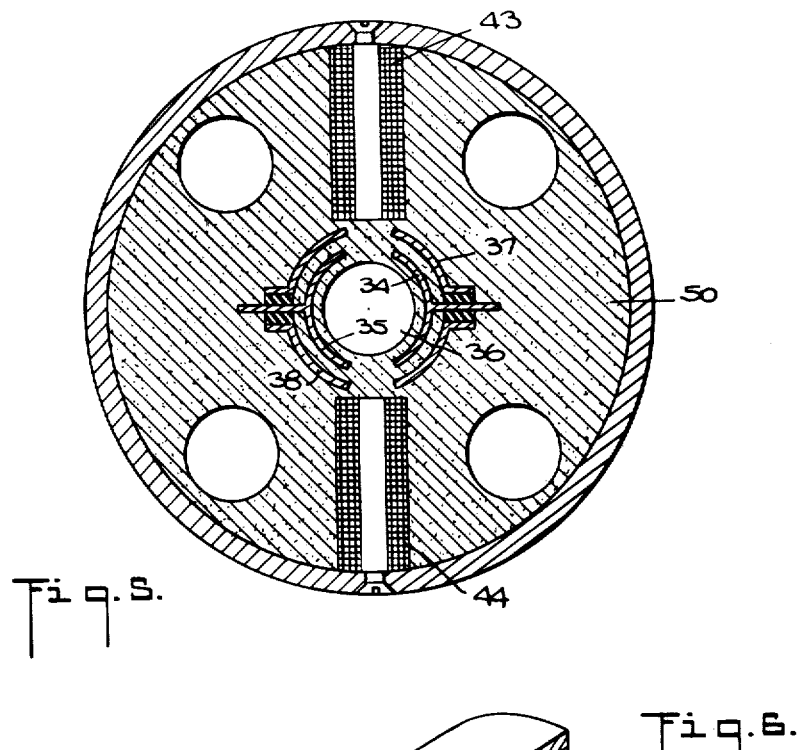
FIG. 5 is a transverse section taken through a fifth embodiment of a cylindrical flowmeter of the driven-shield type which differs from that in FIG. 4 only in that the electrodes are insulated rather than in direct contact with the fluid being metered.

The flowmeter arrangement illustrated in FIG. 5 is identical to that in FIG. 4 and includes planar detecting electrodes 34 and 35 and planar shielding electrodes 37 and 38, except that in this instance electrodes 34 and 35 are displaced inwardly from the wall of passage 36 and are insulated from the fluid by the dielectric material of pressure vessel 50.

Sixth Embodiment

Figure 6:
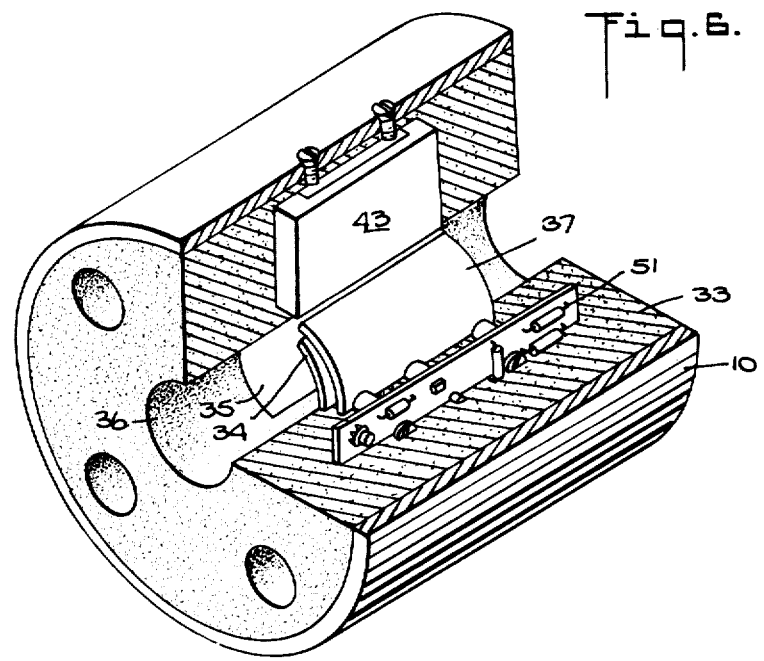
FIG. 6 is a perspective view of a sixth embodiment of a flowmeter in accordance with the invention in which the preamplifier for the electrodes is encapsulated in the meter; the structure being cut away to expose some of the internal components.

The arrangement in FIG. 6 is essentially the same as that in FIG. 4 with planar detecting electrodes 34 and 35 and planar shielding electrodes 37 and 38. However, in this instance, instead of extending leads from these electrodes to a preamplifier external to the unit, as is the usual practice, the preamplifier components are mounted on a printed circuit strip 51 which is joined to shielding electrode 38 and is embedded in pressure vessel 33.

By so embedding the preamplifier in the unit, one not only avoids the need for an external box to house the preamplifier, but microphonics and other noises resulting from an externally-mounted amplifier are avoided, for the preamplifier's position is stable and the circuits thereof are shielded by ring 10.

Seventh Embodiment

In the magnetic flowmeter disclosed in the Mannherz et al. U.S. Pat. No. 3,783,687, whose entire disclosure is incorporated herein by reference, the electromagnet coils are driven by a low-frequency square wave produced by applying the output voltage of an unfiltered full-wave rectifier to the coils and periodically reversing the voltage polarity at a low-frequency rate by means of an electronic switch. The output from the detecting electrodes is fed to an a-c preamplifier.

Figure 7:
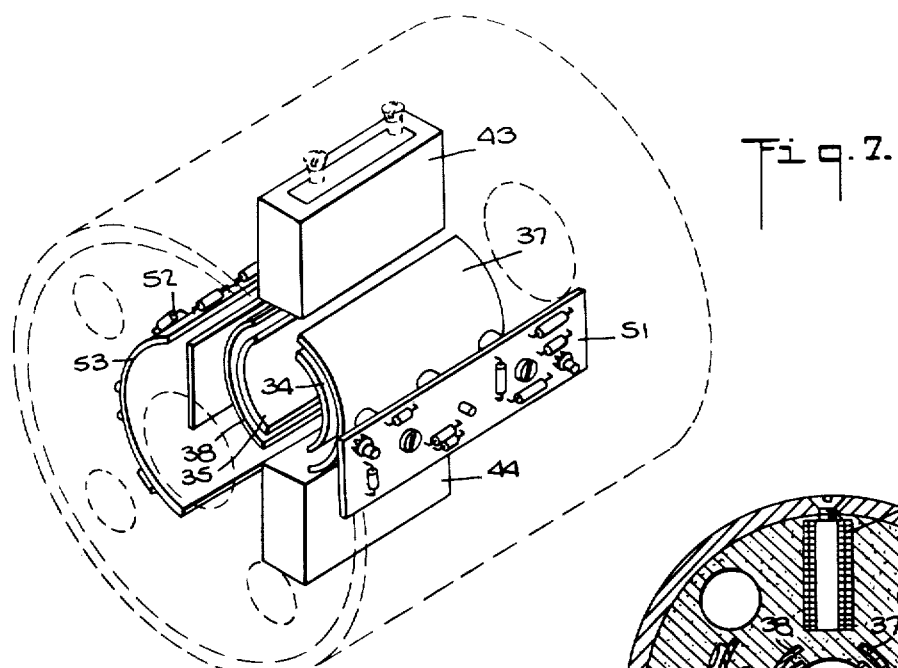
FIG. 7 is a perspective view of a seventh embodiment of a magnetic flowmeter in accordance with the invention in which the drive circuit for the electrodes is also encapsulated in the meter.
Figure 7B:
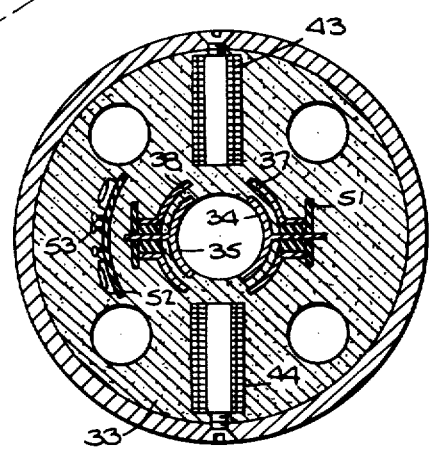
FIG. 7B is a transverse section taken through the meter of FIG. 7.
Figure 7A:
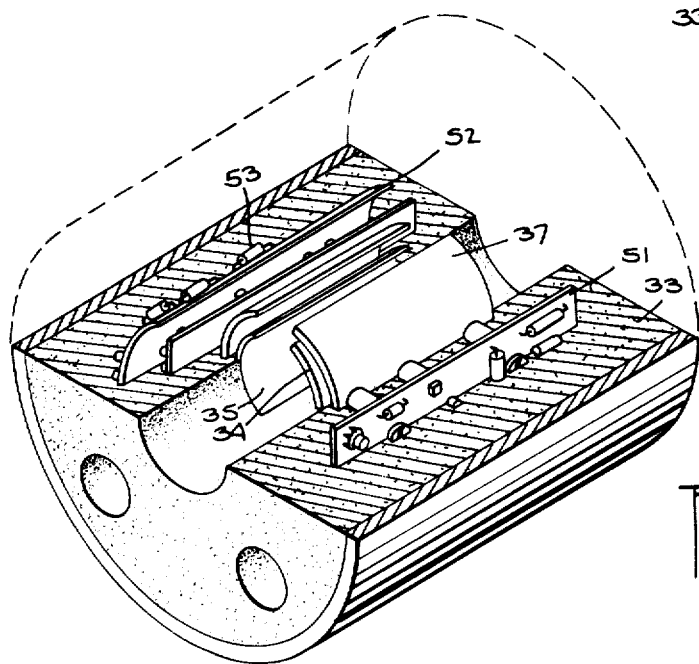
FIG. 7A is the same as FIG. 7 with the structure cut in half to expose some of the internal components.

The embodiment shown in FIG. 7 is identical to that in FIG. 6; but in addition to embedding a preamplifier 51 in the pressure vessel, a drive circuit 52 of the type disclosed in the Mannherz et al. patent is also embedded therein. Drive circuit 52 is initially supported from a curved printed circuit strip 53 mounted on the rear of shielding electrode 38.

Figure 8:
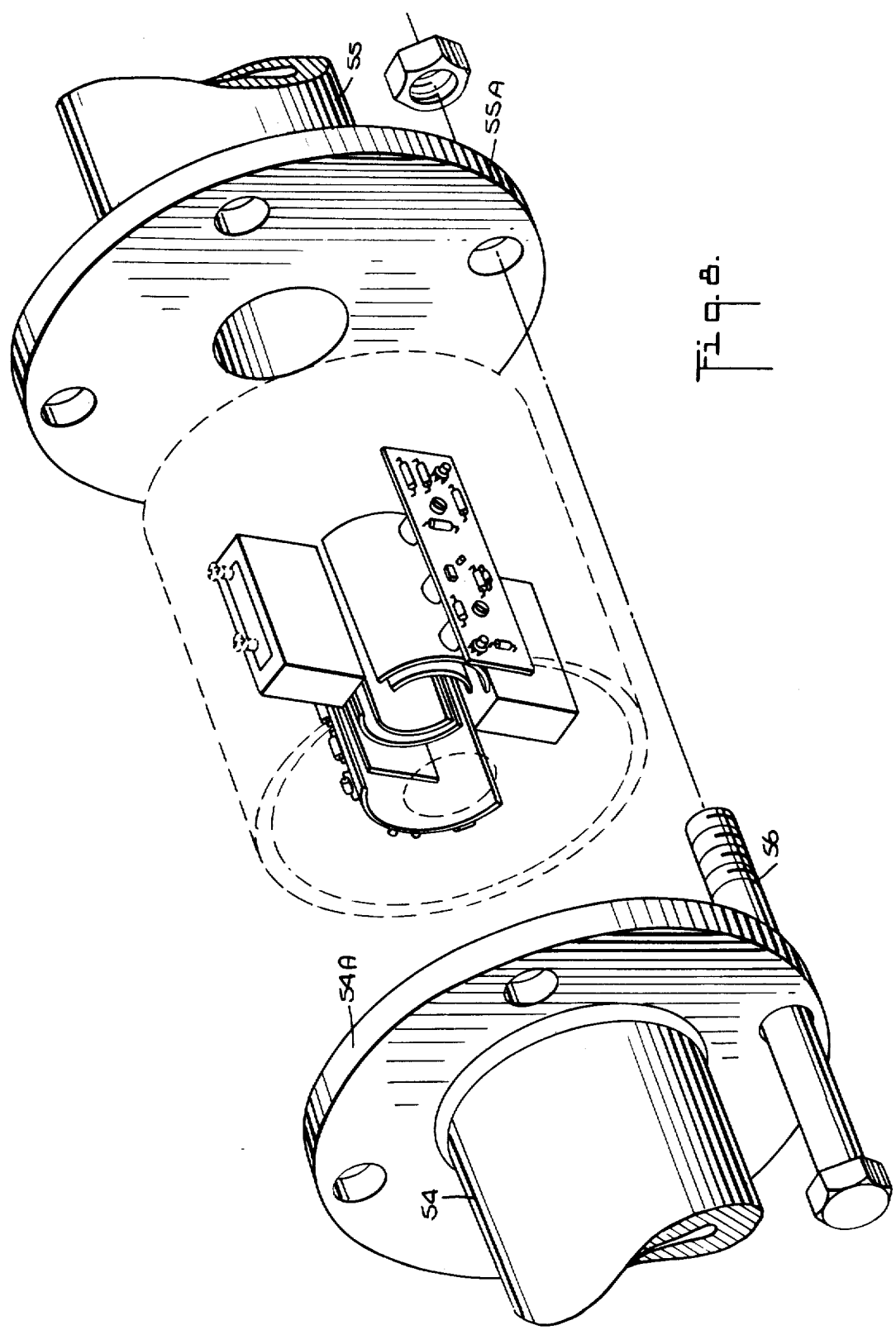
FIG. 8 illustrates, in perspective, how the meter shown in FIG. 7 is installed in a pipe line.

FIG. 8 illustrates the manner in which this unit is compression mounted between flanges 54A and 55A of line pipes 54 and 55 by bridging bolts 56 which act to encage the unit. Hence no use is made in this mounting of the bore holes in the pressure vessel.

While there have been shown and described preferred embodiments of a unitary electromagnetic flowmeter in accordance with the invention, it will be appreciated that many changes and modifications may be made therein without, however, departing from the essential spirit thereof.

I claim:

1. A flangeless electromagnetic flowmeter insertable between upstream and downstream pipes which have the same internal diameter, the adjacent ends of said pipes having like annular flanges, each provided with a like series of holes which lie in a circle, said flowmeter comprising:

A a cylindrical flowmeter body interposed between the flanged ends of the pipes, said body being provided with an annular pressure vessel formed of insulating material to define a central flow passage having a diameter matching the internal diameter of the pipe whereby the flowmeter functions to meter the flow rate of fluid passing through said pipes and said passage along a longitudinal axis extending therethrough;

B a pair of cylindrical electromagnetic coils embedded in said insulating material at diametrically-opposed positions with respect to said passage to establish a magnetic field therein whose lines of flux are substantially perpendicular to said longitudinal axis;

C a pair of electrodes embedded in said insulating material at opposed positions with respect to said passage, said electrodes lying along a transverse axis at right angles both to said lines of flux and said longitudinal axis; said insulating material having bores extending longitudinally therethrough which lie on a circle concentric with said central flow passage and which avoid said coils and said electrodes; and D means bridging said flanged ends to clamp said flowmeter body therebetween, said means being formed by bolts passing through said flange holes and the bores in registration therewith.

2. A flowmeter as set forth in claim 1, wherein said body further includes a metal ring surrounding said pressure vessel.

3. A flowmeter as set forth in claim 1, wherein said vessel is molded about an insulating shell which lines said passage.

4. A flowmeter as set forth in claim 3, wherein said shell includes a pair of opposed sockets for receiving said electrodes.

5. A flowmeter as set forth in claim 4, wherein said shell further includes end flanges.

* * * * *